(12) United States Patent
Mear et al.

(10) Patent No.: US 11,275,912 B2
(45) Date of Patent: Mar. 15, 2022

(54) ELECTRONIC PASSPORT SECURED AGAINST UNAUTHORIZED READING

(71) Applicant: SMART PACKAGING SOLUTIONS, Rousset (FR)

(72) Inventors: Benjamin Mear, Rousset (FR); Stéphan Danler-Baumgartner, Rousset (FR)

(73) Assignee: SMART PACKAGING SOLUTIONS, Rousset (FR)

( * ) Notice: Subject to any disclaimer, the term of this patent is extended or adjusted under 35 U.S.C. 154(b) by 0 days.

(21) Appl. No.: 17/056,485

(22) PCT Filed: May 16, 2019

(86) PCT No.: PCT/FR2019/000075
§ 371 (c)(1),
(2) Date: Nov. 18, 2020

(87) PCT Pub. No.: WO2019/220026
PCT Pub. Date: Nov. 21, 2019

(65) Prior Publication Data
US 2021/0182510 A1    Jun. 17, 2021

(30) Foreign Application Priority Data
May 18, 2018  (FR) ...................................... 1800487

(51) Int. Cl.
| G06K 7/08 | (2006.01) |
| G06K 7/10 | (2006.01) |
| G06K 19/07 | (2006.01) |
| G06K 19/077 | (2006.01) |

(52) U.S. Cl.
CPC ..... *G06K 7/10366* (2013.01); *G06K 19/0723* (2013.01); *G06K 19/07773* (2013.01)

(58) Field of Classification Search
CPC .......... G06K 7/10366; G06K 19/0723; G06K 19/07773

(Continued)

(56) References Cited

U.S. PATENT DOCUMENTS 7,635,089 B2 * 12/2009 Augustinowicz ............................ G06K 19/07327
235/486
8,333,320 B2 * 12/2012 Huot ...................... G06K 19/04
235/382

(Continued)

FOREIGN PATENT DOCUMENTS

| FR | 501378 A | 4/1920 |
| FR | 2879789 A1 | 6/2006 |

(Continued)

OTHER PUBLICATIONS

International Search Report (PCT/ISA/210) dated Oct. 15, 2019, by the European Patent Office as the International Searching Authority for International Application No. PCT/FR2019/000075.

(Continued)

*Primary Examiner* — Ahshik Kim
(74) *Attorney, Agent, or Firm* — Buchanan Ingersoll & Rooney PC

(57) ABSTRACT

A secured document, in the form of a booklet made up of at least one page that can be folded about a folding axis, includes a transponder provided with an electronic chip including memory for data storage and a transponder antenna. The secured document further includes two amplifier antennas, separate from the antenna of the transponder, arranged on pages of the booklet so that, in the open document position, one of the amplifier antennas amplifies the electromagnetic flux picked up by the antenna of the transponder to allow the document to communicate with a remote reader, and, in the closed document position, the amplifier antennas are configured so that the electromagnetic flux picked up by the antenna of the transponder is below a minimal threshold that allows the electronic chip to communicate with a remote reader.

11 Claims, 2 Drawing Sheets

(58) Field of Classification Search
USPC .......................................................... 235/451
See application file for complete search history.

(56) References Cited

U.S. PATENT DOCUMENTS

| | | | | |
|---|---|---|---|---|
| 8,441,403 | B2* | 5/2013 | Peters | G06K 19/07327 |
| | | | | 343/741 |
| 8,604,995 | B2* | 12/2013 | Hammad | G06F 1/1698 |
| | | | | 343/841 |
| 2005/0128085 | A1* | 6/2005 | Bon | G06K 19/025 |
| | | | | 340/572.7 |
| 2007/0164866 | A1 | 7/2007 | Robin et al. | |
| 2010/0283690 | A1 | 11/2010 | Artigue et al. | |
| 2010/0328922 | A1 | 12/2010 | Peters et al. | |
| 2016/0355045 | A1* | 12/2016 | Ivester | B42D 13/00 |
| 2018/0121780 | A1* | 5/2018 | Rosenholtz | G06K 19/07722 |

FOREIGN PATENT DOCUMENTS

| | | |
|---|---|---|
| FR | 2919409 A1 | 1/2009 |
| WO | 2005045754 A1 | 5/2005 |
| WO | 2005066890 A1 | 7/2005 |

OTHER PUBLICATIONS

Written Opinion (PCT/ISA/237) dated Oct. 15, 2019, by the European Patent Office as the International Searching Authority for International Application No. PCT/FR2019/000075.

* cited by examiner

ELECTRONIC PASSPORT SECURED AGAINST UNAUTHORIZED READING

The present invention relates to a contactless electronic passport, or an equivalent security document in the form of a booklet, allowing data to be masked against unauthorized reads.

More and more secure documents, for example of identity document type (passport, identity card, etc.), comprise an electronic contactless readout circuit. The electronic circuit, also called transponder, is formed by an electronic module comprising a chip, and it is connected to an antenna. This type of device for example allows personal data on civil status and biometric and/or administrative data to be stored in digital form. When the secure document has to be checked, for example to check the validity thereof, the stored data are read remotely by an appropriate receiver system, also called reader, by means of an electromagnetic coupling between the electronic circuit of the secure document and the reader. The use of contactless technologies provides significant advantages for the document in terms of lifetime and ergonomics.

However, it is important to assure the owner that the data of his or her identity document cannot be read unbeknownst to the user. Indeed, the contactless technology is that much more accepted when the authorization to read the data stored in the document remains under the control of the bearer of the document.

Now, the standard electronic passports can be subject to unauthorized reads using an external reader, called "skimming" even when they are closed in the pocket of their owner. The aim is to make them readable only when they are in the read mode, that is to say open.

STATE OF THE ART

In order to fight against these devious information reads, several solutions consisting in creating a barrier to the electromagnetic field of a reader on the faraday cage principle have already been proposed.

The simplest known solution consists in inserting, between the pages of the passport, a loose insert made of paper coated with a metal leaf. However, this solution is impractical, the insert having to be removed when the passport is being electrically checked at the border post.

Another solution that is also effective consists in inserting the passport into a metal passport protector, which has the advantage of providing an electromagnetic shielding on the two faces of the passport, but here again this solution is impractical in use, the passport having to be removed from its holder when the passport is being checked.

The problem of masking the data against a read performed unbeknownst to the bearer of the document has also been broached in the document WO2005/066890. This document concerns only the particular case in which the chip of the document is linked to an antenna of relatively large size, disposed on the same sheet as the chip, and that can enter directly into radiofrequency communication with a remote reader. The solution recommended by this prior document consists in disposing, facing the antenna, a passive masking element capable of disrupting the electromagnetic coupling between the transponder and the antenna of the reader, when the document is closed. Consequently, this document necessarily involves a passive masking element, which represents an additional production cost, and which entails, for its realization, one or more production steps, which increases the cost of the technology and consequently the cost of the final identity document. Furthermore, this document does not make it possible to address the new particular case which as emerged, in which the transponder of the document is produced on an add-on dot and provided with an antenna of small size, as described in the patent application FR 05 01378 from the same applicant. In this case, the transponder of the document does not communicate directly by means of its small antenna with a remote reader, but communicates by mutual inductance with a larger amplification antenna (also called booster antenna), also situated on the document, which relays and amplifies the radiofrequency link with the remote reader.

Also known is a document WO 2005/045754 which describes a passport provided with a transponder having an antenna of large size disposed straddling two pages of the passport, so that, when the passport is in the closed position, the electromagnetic field picked up by the antenna of the transponder is nil and does not allow the chip of the transponder to be powered. This document does not make it possible to exploit the transponder technology in the form of an add-on dot to be incorporated in the passport, as described in the abovementioned application FR 05 01378. Furthermore, since the antenna of the transponder is of large size and directly connected to the chip of the transponder, should the antenna break, which is notably likely to occur at the fold of the antenna, all of the passport must be replaced, which represents a significant cost. Furthermore, this document is not suited to readers configured to read only a single page of the passport.

Finally, from the document FR 2 919 409 A1, a secure document is known that comprises a single foldable antenna distinct from the antenna of the transponder, and disposed straddling two pages of the document so that, when the latter is in the open position, it amplifies the electromagnetic flux picked up by the antenna of the transponder, and, when the document is in the closed position, it reduces the electromagnetic flux picked up by the antenna of the transponder below a minimum threshold allowing the electronic chip to communicate with a remote reader.

AIM OF THE INVENTION

One aim of the invention is to propose a novel electronic passport structure that is particularly simple and economical to manufacture and easy to read in the open position, while reinforcing the effectiveness of the masking of the data against an authorized read in the closed position.

SUBJECT OF THE INVENTION

In principle, the solution according to the invention consists in placing 2 antennas that are similar in geometry facing one another in order for their electromagnetic fluxes to be canceled out when the booklet is in the closed position and prevent the transponder from communicating with a remote reader.

The subject of the invention is therefore a secure document taking the form of a book composed of at least one sheet that can be folded about a folding axis, the document comprising a transponder provided with an electronic chip comprising a memory for the storage of data and a transponder antenna, characterized in that it further comprises two amplification antennas, distinct from the antenna of the transponder, disposed on pages of the document so that, when the document is in the open position, one of the amplification antennas amplifies the electromagnetic flux picked by the antenna of the transponder to allow the document to communicate with a remote reader, and in that the amplification antennas are configured so that, when the document is in the close position, the electromagnetic flux picked by the antenna of the transponder is below a minimum necessary to allow the electronic chip to communicate with a remote reader.

Preferably, the two amplification antennas or booster antennas are configured so that the electromagnetic fluxes that they generate when the booklet is in the closed position are substantially opposite so as to cancel out the amplification effect and prevent communication between the transponder and a remote reader.

To this end, according to one embodiment, the two amplification antennas have antenna geometries that are substantially identical and symmetrical with respect to the folding axis of the document so as to be overlaid when the document is in the closed position.

However, the document must also be read by a reader when it is in the open position. To this end, each amplification antenna has a resonance frequency capable of ensuring, when the internal sheet bearing the antenna of the transponder is pressed against it when the document is in the open position, a sufficient electromagnetic coupling between said amplification antenna and the antenna of the transponder to allow the electronic chip to communicate with a remote reader.

According to an advantageous embodiment, the amplification antenna is a booster antenna comprising turns of large size, notably in the so-called ID1 format (as defined in the ISO 13444 standard) connected to a concentrator antenna.

Several relative dispositions of the booster antennas and of the transponder are possible while still achieving the objectives targeted by the invention.

According to one embodiment, the transponder is situated on an internal page of the booklet, and the two amplification antennas, distinct from the antenna of the transponder, are disposed on pages of the booklet situated on either side of the internal page bearing the transponder.

According to another embodiment, the transponder and one of the two booster antennas are situated on one and the same outer page or cover page of the document, and the other booster antenna is situated on the other cover page or on another internal page of the document.

According to a third embodiment, one of the two booster antennas and the transponder are situated on one and the same internal page of the document, and the other booster antenna is situated on an outer page or cover page of the document.

According to an advantageous embodiment, one of the amplification antennas has a resonance frequency lower than the frequency of the carrier used by the transponder, and the other amplification antenna has a resonance frequency higher than the frequency of the carrier used by the transponder.

According to one embodiment, the frequency of the carrier used by the transponder is 13.56 MHz, and the resonance frequencies of the two amplification antennas are situated on either side of the carrier frequency and are spaced apart by approximately 2 MHz.

According to one embodiment of the document, the page of data which bears the transponder is made of polycarbonate.

DETAILED DESCRIPTION

The invention will be described in detail with reference to the attached figures in which.

Figure 1:
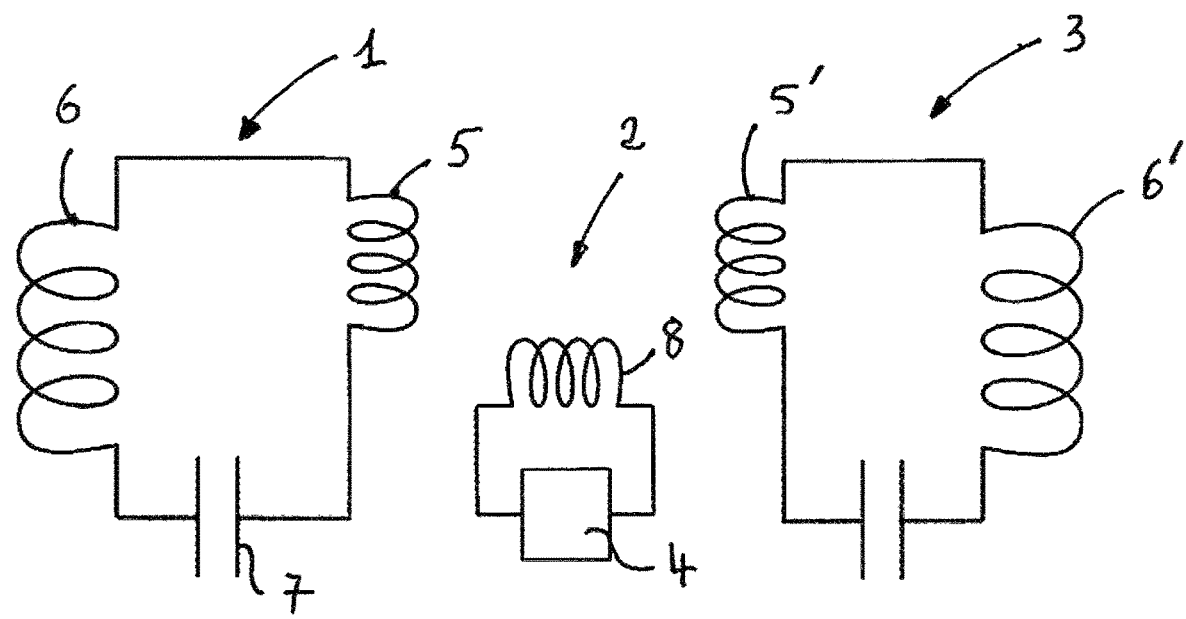
FIG. 1 represents an equivalent electrical circuit diagram of the electronic passport according to the invention.

The reader is referred to FIG. 1, which represents an equivalent electrical circuit diagram of the electronic passport according to the invention. From an electrical point of view, the electronic document or passport 20 comprises a transponder 2, and two booster antennas 1,3.

The transponder 2 is composed of a microelectronic chip 4 provided with its internal capacitance (not represented) and an inductance 8, the capacitance and the inductance forming a resonant radiofrequency circuit allowing communication in contactless mode.

The two booster antennas (1,3) each comprise, conventionally, a first inductance (6,6') formed by turns of large size, notably in the format called ID1 in the ISO 14443-1 standard, and a second inductance (5,5') formed by turns of smaller size intended to be coupled, in turn, with the turns of the inductance 8 of the transponder 2 in order to amplify the signal from the transponder and allow radiofrequency communication between the transponder and a remote contactless reader.

Figure 2:
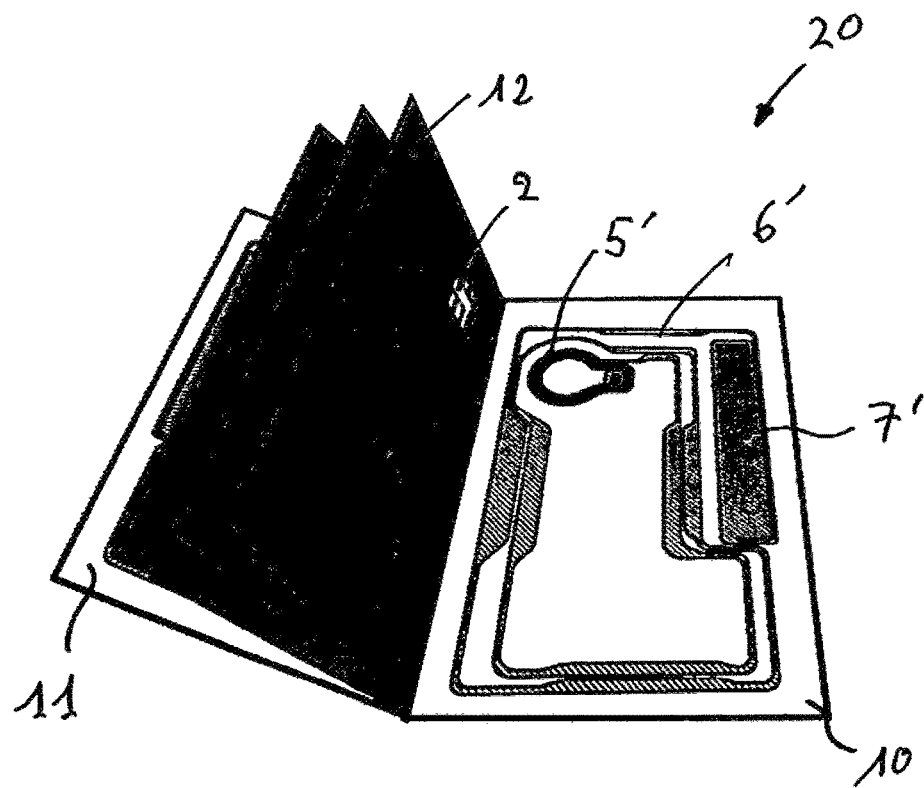
FIG. 2 represents a first embodiment of the electronic passport according to the invention.
Figure 3:
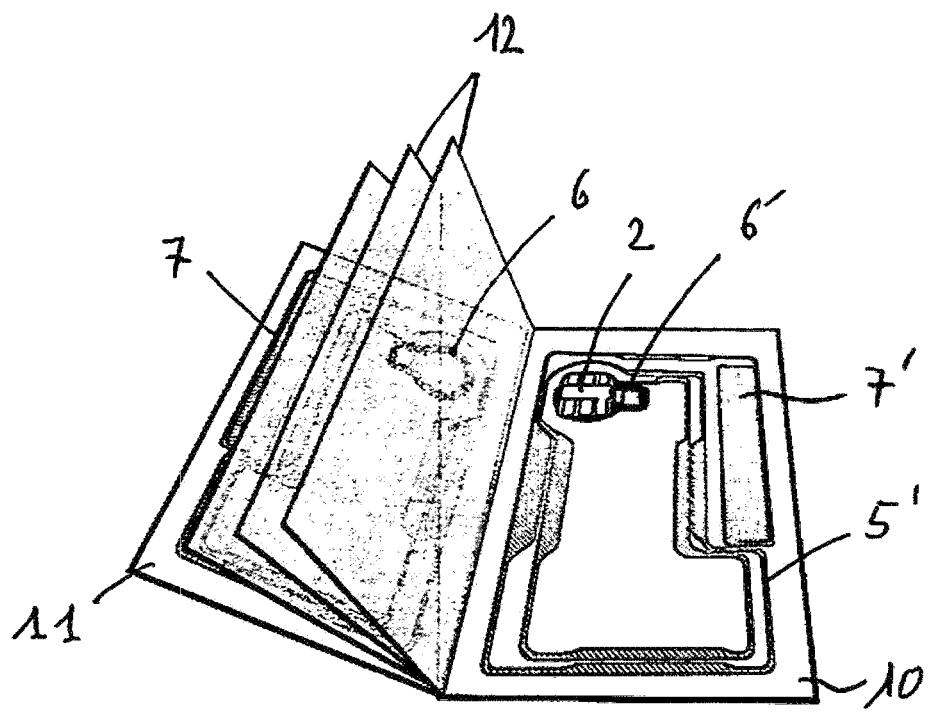
FIG. 3 represents a second embodiment of the electronic passport according to the invention.
Figure 4:
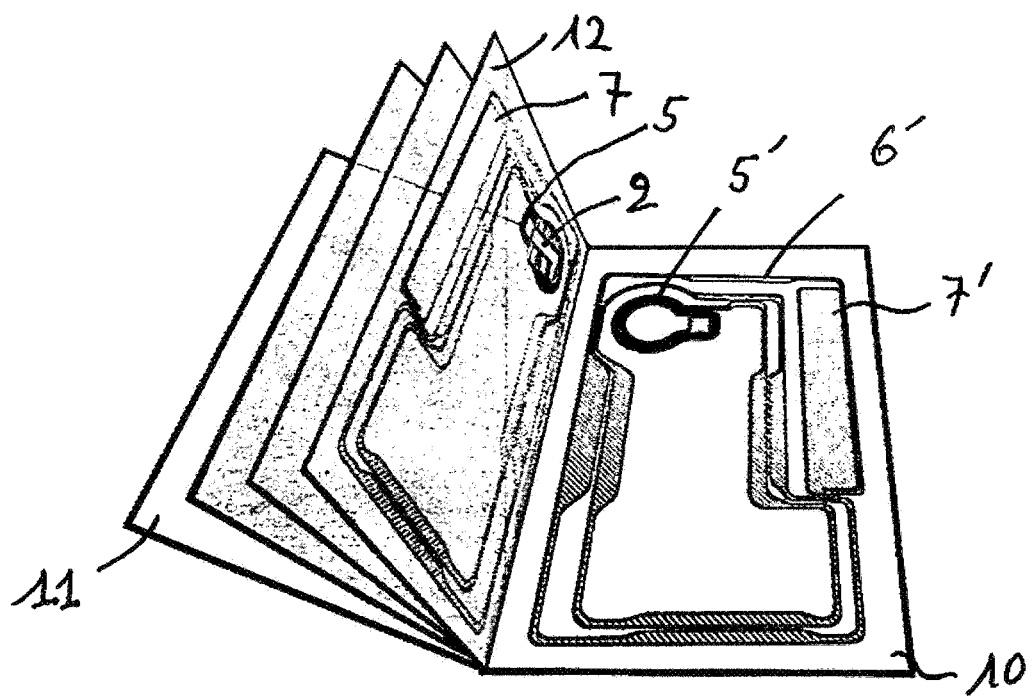
FIG. 4 represents a third embodiment of the electronic passport according to the invention.

FIGS. 2 to 4 represent several concrete dispositions of the transponder 2 and of the booster antennas 1,3 on a passport booklet 20.

In a first embodiment (FIG. 2), the transponder 2 is incorporated in an internal page 12 of the booklet of the passport, and the two booster antennas (1,3) are disposed in the cover pages (11,10) of the passport. This configuration offers the advantage that the internal page 12 which bears the transponder can be a conventional data page, made of polycarbonate. In this configuration, to ensure radiofrequency communication between the transponder and a remote reader, it is necessary to press the page 12 which bears the transponder 2 against one of the cover pages (10,11) of the passport, in order to ensure an electromagnetic coupling between the transponder and one of the booster antennas (1,3).

In a second embodiment (FIG. 3), the transponder 2 is incorporated in one of the cover pages (10,11) which bears the booster antennas (1,3). In this case, the passport can communicate with a remote reader as soon as it is in open position, since the antenna of the transponder will always be coupled with a booster antenna, in this case with the booster antenna 3 incorporated in the back cover page 10 in the version represented. The other booster antenna 1 can be incorporated in the other cover page 11, or in an internal page 12 of the document.

In a third embodiment (FIG. 4), the transponder 2 and one of the booster antennas (1,3) are both incorporated in an internal page 12 of the passport booklet. Here again, the passport can communicate with a remote reader as soon as it is in open position, since the antenna of the transponder will always be coupled with one of the booster antennas, in this case with the booster antenna 1.

It is essential to note that, according to the invention, the booster antennas (1,3), whatever their positions on the pages of the passport booklet, are configured so that, when the passport is in closed position, the electromagnetic fluxes that they generate when they are placed in the electromagnetic field of a reader, are substantially canceled out, or at least are sufficiently disturbed for the resulting field not to allow radiofrequency communication between the transponder 2 and a remote reader.

In order to obtain this result, it is useful for the geometries of the booster antennas (1,3) to be identical or almost identical. For example, the turns of the inductances (5,6) of the first booster antenna 1 have the same size and the same position on the passport page as, respectively, the turns of the inductances (5',6') of the second booster antenna 3.

The booster antennas (1,3) are advantageously produced by etching from booklet pages coated with a thin layer of aluminum or equivalent.

Tests have shown that the best results in terms of blocking communication when the passport is in closed position are obtained when the adjustment capacitances (7,7') of the two booster antennas (1,3) are slightly different so that the resonance peaks of the two booster antennas are offset by a certain value. Thus, when the operating frequency of the transponder is of the order of 13.56 MHz, as is the case conventionally, it is optimal for the resonance frequencies of the booster antennas to be, for one, lower than 13.56 MHz and, for the other, higher than 13.56 MHz, and for them to be separated by a value of the order of 2 MHz.

Advantages of the Invention

The invention meets the aims set and provides a way to mitigate the limitations of known electronic passports.

In particular, the secure document according to the invention is effective in closed position, whatever the surface (front, rear) of the document exposed to the electromagnetic flux of a reader, while known secure documents which are provided with an electromagnetic shielding leaf are effective primarily when the surface presented to the reader is that which bears the shielding leaf, but are less effective when the face presented to the reader does not bear a shielding leaf.

Moreover, because of the incorporation of the electromagnetic shielding functionality in the passport itself, the latter offers better ergonomics because there is no need to remove a sleeve or a metal insert.

Furthermore, the techniques for fabricating antennas by etching layers of aluminum allow inductances of precise value to be produced, and at low cost price.

The invention claimed is:

1. A secure document having the form of a booklet composed of at least one sheet that can be folded about a folding axis, the document comprising:
   a transponder provided with an electronic chip comprising a memory for the storage of data and a transponder antenna, and
   a first amplification antenna and a second amplification antenna,
      wherein said first antenna and said second antenna are distinct from one another and distinct from the antenna of the transponder,
      wherein said first antenna and said second antenna are disposed on separate pages of the document so that, when the document is in the open position, one of the first and second amplification antennas amplifies electromagnetic flux picked up by the antenna of the transponder to allow the document to communicate with a remote reader,
      wherein the first amplification antenna and the second amplification antenna are configured so that, when the document is in the closed position, the electromagnetic flux picked by the antenna of the transponder is below a minimum threshold that allows the electronic chip to communicate with a remote reader.

2. The secure document as claimed in claim 1, wherein the first and second amplification antennas are configured so that the electromagnetic fluxes that they generate when the booklet is in the closed position are substantially opposed so as to cancel the amplification effect and prevent the communication between the transponder and a remote reader.

3. The secure document as claimed in claim 1, wherein the first and second amplification antennas have antenna geometries that are substantially identical and symmetrical with respect to the folding axis so as to be overlaid when the document is in the closed position.

4. The secure document as claimed in claim 1, wherein the first and second amplification antennas each has a resonance frequency capable of ensuring, when an internal sheet bearing the antenna of the transponder is pressed against one of the first and second amplification antennas when the document is in the open position, a sufficient electromagnetic coupling between said one of the first and second amplification antennas and the antenna of the transponder to allow the electronic chip to communicate with a remote reader.

5. The secure document as claimed in claim 1, wherein the first and second amplification antennas are booster antennas comprising turns in a ID1 format connected to a concentrator antenna.

6. The secure document as claimed in claim 1, wherein the transponder is situated on an internal page of the booklet, and the first and second amplification antennas, distinct from the antenna of the transponder, are disposed on pages of the booklet situated on either side of the internal page bearing the transponder.

7. The secure document as claimed in claim 1, wherein the transponder and one of the first and second amplification antennas are situated on one and the same outer page or cover page of the document, and the other of the first and second amplification antennas is situated on the other cover page or on an internal page of the document.

8. The secure document as claimed in claim 1, wherein the transponder and one of the first and second amplification antennas are situated on one and the same internal page of the document, and the other one of the first and second amplification antennas booster antenna is situated on an external page or cover page of the document.

9. The secure document as claimed in claim 1, wherein one of the first and second amplification antennas has a resonance frequency lower than a carrier frequency used by the transponder, the other one of the first and second amplification antennas has a resonance frequency higher than the frequency of the carrier used by the transponder.

10. The secure document as claimed in claim 9, wherein the frequency of the carrier used by the transponder is 13.56 MHz, and the resonance frequencies of the first and second amplification antennas are spaced apart by approximately 2 MHz.

11. The secure document as claimed in claim 1, wherein a page of data which bears the transponder is made of polycarbonate.

* * * * *